US010914389B2

(12) United States Patent
Mainzer et al.

(10) Patent No.: US 10,914,389 B2
(45) Date of Patent: Feb. 9, 2021

(54) HIGH PRESSURE DETACHABLE/RETRACTABLE STOPPER PLUG

(71) Applicant: OPERATIONS TECHNOLOGY DEVELOPMENT, NFP, Des Plaines, IL (US)

(72) Inventors: Jeffery W. Mainzer, Cary, IL (US); James E. Huebler, Brookfield, IL (US); Jim Diehl, Algonquin, IL (US)

(73) Assignee: OPERATIONS TECHNOLOGY DEVELOPMENT, NFP, Des Plaines, IL (US)

( * ) Notice: Subject to any disclaimer, the term of this patent is extended or adjusted under 35 U.S.C. 154(b) by 0 days.

(21) Appl. No.: 16/400,213

(22) Filed: May 1, 2019

(65) Prior Publication Data

US 2019/0338858 A1   Nov. 7, 2019

Related U.S. Application Data

(60) Provisional application No. 62/665,224, filed on May 1, 2018.

(51) Int. Cl.
*F16K 7/10* (2006.01)
*F16K 31/126* (2006.01)

(52) U.S. Cl.
CPC .............. *F16K 7/10* (2013.01); *F16K 31/126* (2013.01)

(58) Field of Classification Search
CPC ................................ F16K 7/10; F16K 31/126
USPC ............................ 138/94, 93; 137/223, 231
See application file for complete search history.

(56) References Cited

U.S. PATENT DOCUMENTS

| 1,814,677 | A | * | 7/1931 | Fennema | ................... | F16K 7/10 |
| | | | | | | 138/93 |
| 4,614,206 | A | * | 9/1986 | Mathison | ................... | F16K 7/10 |
| | | | | | | 138/93 |
| 5,234,034 | A | * | 8/1993 | Lyon | ..................... | F16L 55/124 |
| | | | | | | 138/93 |
| 5,771,937 | A | * | 6/1998 | Collins | ..................... | F16K 7/10 |
| | | | | | | 138/89 |
| 2009/0050224 | A1 | * | 2/2009 | Lundnnan | ............... | F16L 55/44 |
| | | | | | | 138/93 |
| 2017/0030482 | A1 | * | 2/2017 | Domsch | ................ | F16K 43/001 |

* cited by examiner

*Primary Examiner* — Kevin L Lee
(74) *Attorney, Agent, or Firm* — Pauley Erickson & Swanson

(57) ABSTRACT

A system for stopping flow in a pipe with a plug positioned in the pipe to allow for repairs of the pipe. The plug comprises a body with an inflatable or compressible member, and a cap and connector valve on the body. An inflation line with a coupling connects to the valve for blocking off and sealing a damaged area of the pipe. An inflation line is used to deposit and retrieve the plug within the pipe before and after a repair is made.

20 Claims, 5 Drawing Sheets

HIGH PRESSURE DETACHABLE/RETRACTABLE STOPPER PLUG

CROSS-REFERENCE TO RELATED APPLICATIONS

This application is related to and claims priority from earlier filed U.S. Provisional Patent Application No. 62/665,224, filed 1 May 2018.

BACKGROUND OF THE INVENTION

Field of the Invention

This invention relates generally to an apparatus for temporarily stopping off a section of pipe for replacing and/or repairing a pipeline. More specifically, the present invention relates to a plug device for installation into a pipeline with a larger diameter than the plug. The plug is able to expand in various ways while inside the pipeline thereby stopping the flow of fluids, gases and other materials through the pipeline, and allowing for safe servicing of the pipeline.

When walls or soffits of a pipeline are damaged, such as when walls may be cracked, pitted or spalled, the damage may case fluids, gases or other debris to leak out of the pipeline, or even unwanted foreign debris to leak into the pipeline. In such instances, it is desirable to repair the damaged pipeline to prevent further leakage or contamination. When repairing a pipeline of this nature, such a repair has been accomplished by stopping off a section of the pipeline where the damaged has occurred, and using a line inserted into the pipeline to apply a "stop" to essentially close off flow to the affected area of the pipeline. The line then aids in maintaining the closure of the pipeline while the repair is being performed. There is a further need for a more efficient repair process of a pipeline to still stop off a portion of a pipeline, without an insertion line getting in the way of the repair process.

SUMMARY OF THE INVENTION

Known devices are available for stopping off a section of pipe. However, these known devices are unable to be disconnected from an insertion or inflation line during the repair, and then re-connected to the line for removal and retrieval of the stopping device after the repair is completed.

The invention of this application comprises an apparatus for temporarily or permanently shutting off pressure flow in pipes, preferably natural gas service lines, as described in more detail below.

In an embodiment of this invention, the device comprises an inflatable plug and an inflation line for stopping flow in a pipe. In this embodiment, the plug includes a body with an inflatable member surrounding the body. The body further includes a cap on a first end and an inflation connector valve on an opposite second end of the body. The inflation line is connected to a pump for inflating the plug and a tether for insertion and retrieval of the plug. The inflation line further includes a coupling for connecting to the connector valve on the plug. The coupling may further include a magnet for simplifying the connection of the line to the plug.

In operation, the plug is positioned in the pipe to be repaired with the inflation line. The inflation line then inflates the inflatable member, expanding an outside diameter to seal the pipe. Preferably, the inflation line then detaches from the plug, leaving the plug in place while the line is removed from the pipe. A sealed-off section of the pipe is then repaired and/or replaced. After repair, the inflation line is then reinserted into the pipe and reconnected to the plug. The inflation line then deflates the inflatable member unsealing the pipe and the plug is removed from the pipe with the inflation line.

In another embodiment of this invention, the system for stopping flow in a pipe includes a compressible plug and an insertion line. In this embodiment, the plug includes a piston with a compressible member surrounding the piston and a connector. The insertion line includes a tether for insertion and retrieval of the plug. The insertion line also includes a coupling for connecting to the connector on the plug. The coupling may further include a magnet for simplifying the connection of the line to the plug.

In operation, the plug is positioned in the pipe to be repaired with the insertion line. The compressible member then collapses along the piston increasing an outside diameter of the compressible member and thereby sealing the pipe. Preferably, the insertion line then detaches from the plug and is removed from the pipe while the pipe is repaired. After the repair is completed, the plug is retrieved by reconnecting the insertion line to the plug, the compressible member then extends along the piston reducing the outside diameter of the compressible member and unsealing the pipe. The plug is then removed from the pipe with the insertion line.

In an embodiment of this invention, the pipe to be repaired may be sealed with a plurality of plugs including both the inflatable plug and compressible plugs.

The invention is unique due to the capability of the plug to be inserted into the pipe with the insertion line, detached from the insertion line during repair, and reconnected to the insertion line, for removal, after the repair is completed.

BRIEF DESCRIPTION OF THE DRAWINGS

These and other objects and features of this invention will be better understood from the following detailed description taken in conjunction with the following drawings.

DESCRIPTION OF PREFERRED EMBODIMENTS

In a preferred embodiment, a system for blocking a pipeline for repairs includes a plug 10 and a device for setting the plug in position in a pipe 50. The setting device is preferably capable of detaching and separating from the plug 10, while repairs are performed on the pipeline, and also capable of reengaging the plug 10, after repairs are completed, for removal of the plug 10 from the pipeline.

Figure 1:
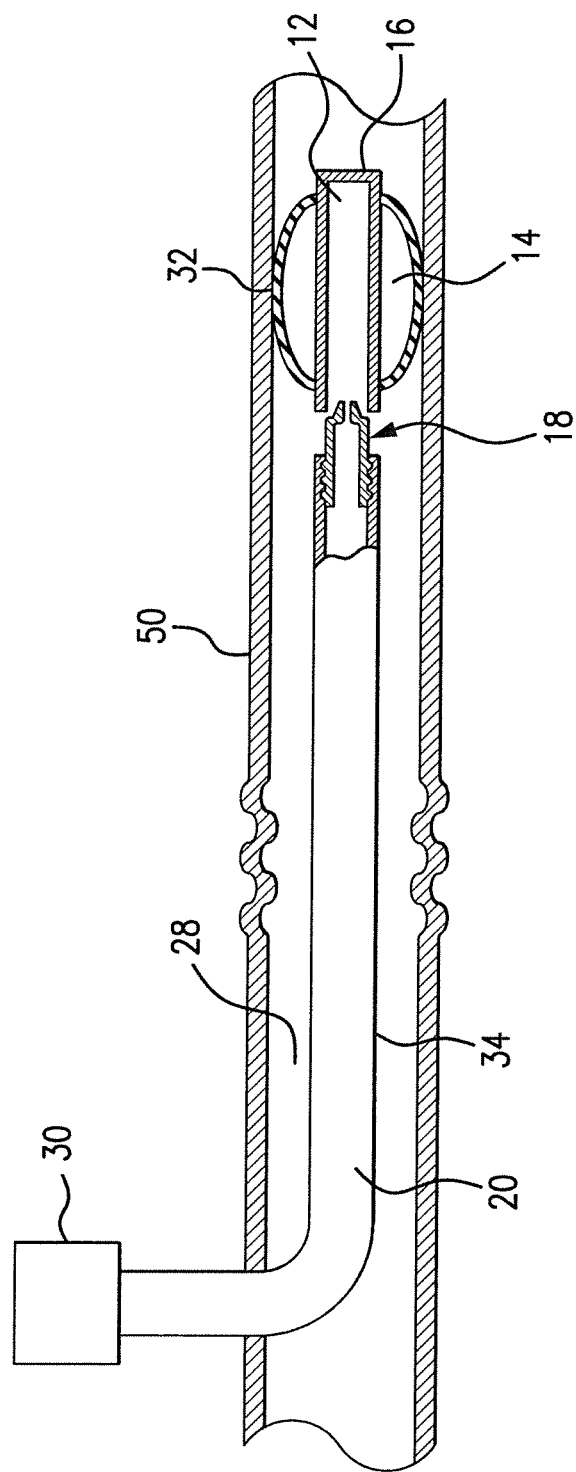
FIG. 1 shows a side view of a plug for temporarily or permanently stopping flow in a pipeline according to a preferred embodiment of the invention.
Figure 2C:
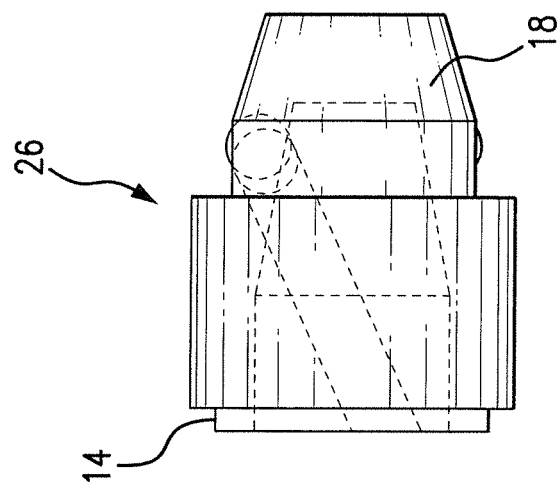
FIG. 2C shows a schematic view of yet another part of the plug for temporarily or permanently stopping flow in a pipeline according to the embodiment of FIG. 1.
Figure 2B:
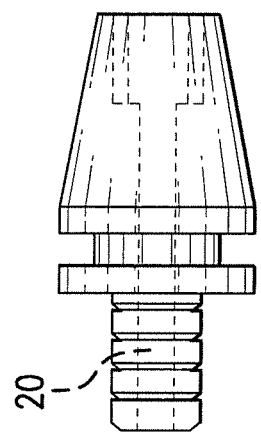
FIG. 2B shows a schematic view of another part of the plug for temporarily or permanently stopping flow in a pipeline according to the embodiment of FIG. 1.
Figure 2A:
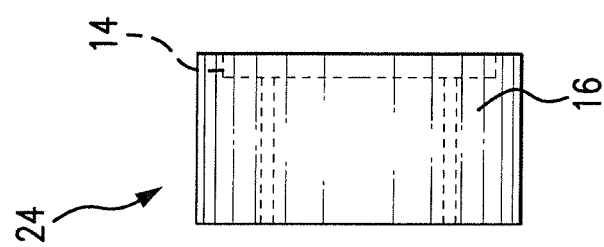
FIG. 2A shows a schematic view of one part of the plug for temporarily or permanently stopping flow in a pipeline according to the embodiment of FIG. 1.
Figure 3A:
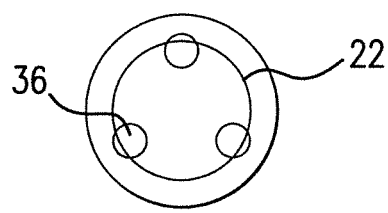
FIG. 3A shows a cross-sectional view of the part of the plug for temporarily or permanently stopping flow in a pipeline shown in FIG. 2C according to the embodiment of FIG. 1.
Figure 3B:
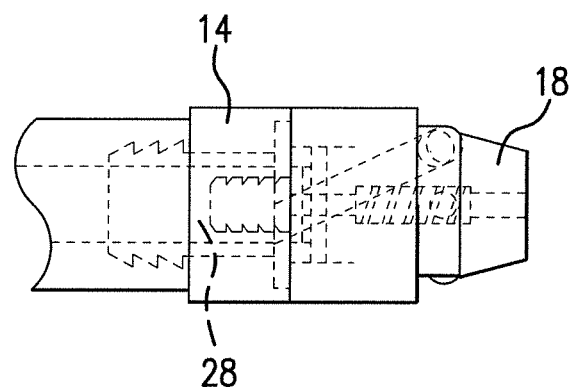
FIG. 3B shows a schematic view of the parts of the plug for temporarily or permanently stopping flow in a pipeline shown in FIGS. 2B and 2C combined, according to the embodiment of FIG. 1.
Figure 3C:
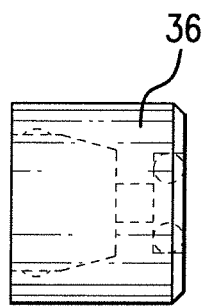
FIG. 3C shows a schematic view of a female end of the plug for temporarily or permanently stopping flow in a pipeline according to the embodiment of FIG. 1.
Figure 3D:
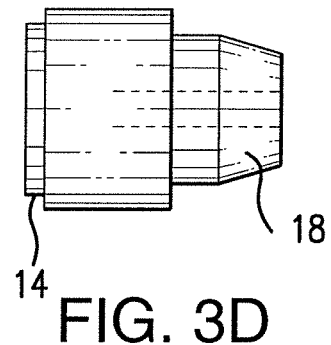
FIG. 3D shows a simplified schematic view of the plug for temporarily or permanently stopping flow in a pipeline according to the embodiment of FIG. 1.

According to an embodiment of the invention, as shown in FIG. 1, the plug inside the pipe 50 includes a body 12 with an inflatable member 14 surrounding the body 12. In a preferred embodiment, the body 12 is made of durable materials capable of withstanding the materials transported through the pipeline. It is also preferred that the body 12 is made of materials that are non-reactive to the materials transported through the pipeline. The inflatable member 14 is also made of a durable, non-reactive material that is further capable of expansion and capable of sealing the pipeline when expanded. In a preferred embodiment, the inflatable member 14 is manufactured of rubber. The body 12 further includes a cap 16 on a first end 24 of the body, and an inflation connector valve 18 on an opposite second end 26 of the body 12; details of which are further seen in FIG. 2A-C. In one embodiment the cap 16 may attach to the body 12 with a threaded connecting means. The threaded connecting means may be in the form of a screw. In one embodiment of this invention the cap 16 is molded, after which an over molding of the inflatable member 14 takes place with an injection moldable rubber.

As shown throughout FIG. 1 and FIGS. 3A-D, the system further includes an inflation line 20, for setting the plug 10 in position in the pipeline to be repaired. The inflation line 20 connects with a pump 30 for inflating the plug 10, and a tether 34 for insertion and retrieval of the plug 10. In one embodiment, the tether 34 and inflation line 20 comprise a same tube. The inflation line 20 further includes a coupling 22 for connecting to the connector valve 18 on the plug 10. The coupling 22 simplifies the connection of the inflation line 20 to the plug 10 by a connecting means. In a preferred embodiment, the connecting means may include a magnetic component 36. For instance, the magnetic component 36 may be a plurality of magnetic points around the circumference of the coupling 22, or a magnetic socket for accepting the connector valve 18. One side of the coupling 22 may connect to the magnetic component 36 while another side of the coupling 22 may connect with the inflation line 20. In one embodiment the coupling 22 may screw into the cap 16, and house the magnetic component 36.

In operation, the system of this invention is capable of entering the pipe via a no-blow stuffing box through a gas riser. With the aid of the tether 34, the inflation line 20 pushes the plug 10 into the pipeline to a desired area for the repair. Next, the pump 30 transfers an expansion substance, such as air, through the inflation line 20. In one scenario, the expansion substance passes through the inflation line 20 which also functions as the tether 34. The tether 34 and inflation line 20 allow air to fill and deflate the plug 10. The inflation line 20 inflates the plug 10 by expanding the inflatable member 14 until the inflatable member 14 contacts an inner surface of the pipe 28 creating a seal 32 between the pipe 50 and the plug 10. The inflation line 20 may then be disconnected from the plug 10 by being pulled back out of the pipeline with the aid of the tether 34. The coupling 22 with the magnetic component 36 allows the connection of the connector valve 18 on the plug 10 to remain stable, while also providing ease of removal and disconnection when desired. In one embodiment this is accomplished by the aid of ball bearings encased around a fitting on the coupling 22 of the inflation line 20. These ball bearings may hold the inflation line 20 and plug 10 connection stable while inflating and moving the entire plug 10 in and out of the pipe 50. In this embodiment the magnetic component 36 is used to easily reconnect the inflation line 20 with the plug 10. Here, air functions to both inflate the inflatable member 14 and also push and energize the ball bearings for a secure connection between the inflation line 20 and the plug 10.

Figure 4:
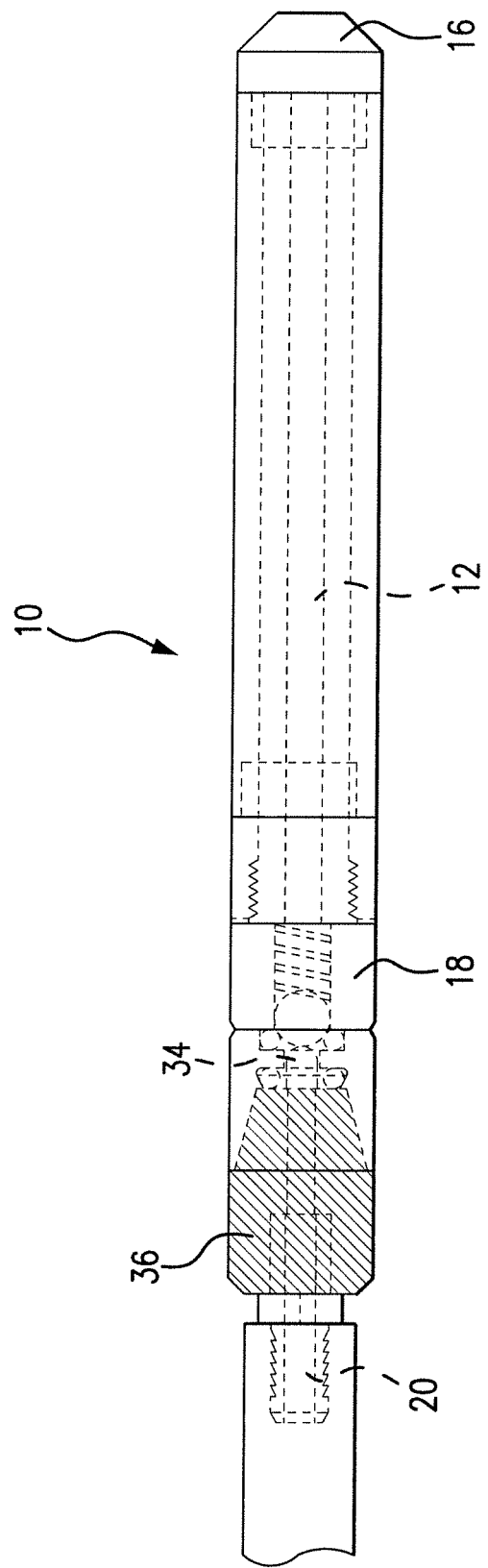
FIG. 4 shows a further schematic view of the plug for temporarily or permanently stopping flow in a pipeline according to the embodiment of FIG. 1.

After the pipe is repaired, if desired, the plug 10 may remain in place and the seal of the pipeline intact. If removal of the plug 10 from the pipeline is desired, the inflation line 20 is pushed back down the pipeline and re-engages the plug 10. In another embodiment, a rod engages with the plug 10 before the inflation line 20. The inflation line 20 is then inserted after the rod to reconnect with the plug 10. The magnetic component 36 may also aid with the deflation connection in this embodiment. The pump 30 allows the plug 10 to deflate the inflatable member 14. The rod may aid in deflation by releasing pressure while interacting with the connector valve 18. Then the whole assembly, which is shown together in FIG. 4, is retrieved through the gas riser and the stuffing box allowing the pipeline to pressurize again. In one embodiment the ball bearings may further maintain a secure connection during deflation to aid in retrieving the entire plug 10 in one piece when it is removed from the pipe 50.

Figure 5A:
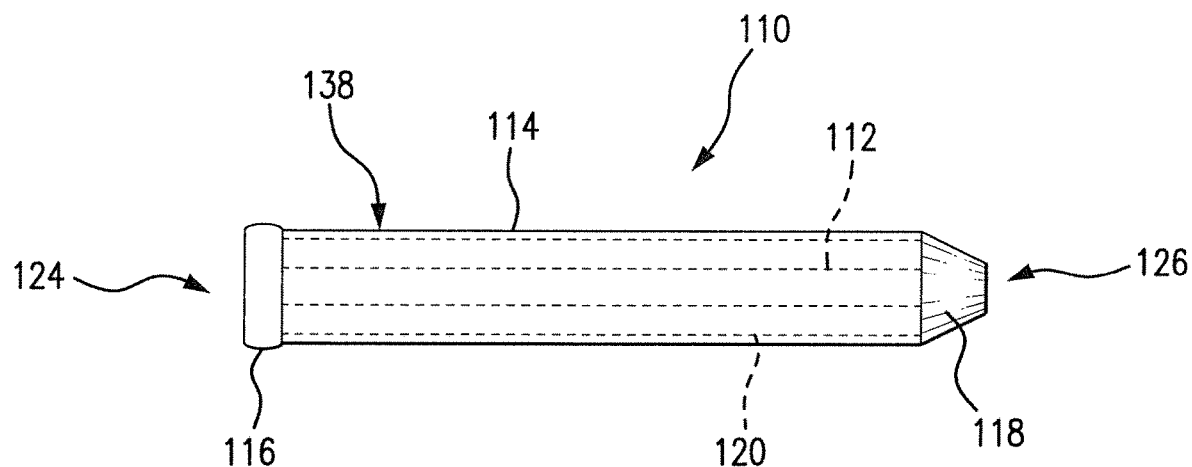
FIG. 5A shows a side view of a plug for temporarily or permanently stopping flow in a pipeline according to another embodiment of the invention.
Figure 5B:
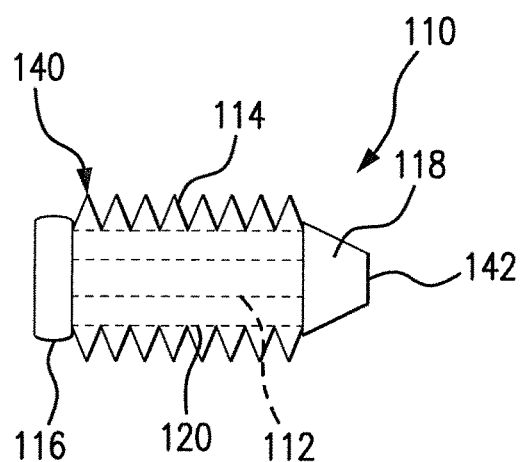
FIG. 5B shows a modified side view of the plug for temporarily or permanently stopping flow in a pipeline according to the embodiment of FIG. 5A.

According to another embodiment of the invention, shown in FIGS. 5A and 5B, a plug 110 includes a center piston 112 with a compressible member 114 positioned around the center piston 112. The plug 110 further includes a cap 116 on a first end 124 and a slider 118 on an opposite second end 126 of the piston 112. The compressible member 114 is made of durable, non-reactive materials. The compressible member 114 is preferably made of silicone tubing that is capable of sliding and folding along the center piston 112 to increase an outer diameter of the compressible member 114. For example, as shown in FIG. 5A, the slider 118 is in an extended position with the compressible member 114 extended and with a narrow first outside diameter 138. As shown in FIG. 5B, the slider 118 is in a retracted position with the compressible member 114 folded on itself, or "scrunched", creating a larger outside diameter 140 which is capable of sealing the pipeline.

Figure 5C:
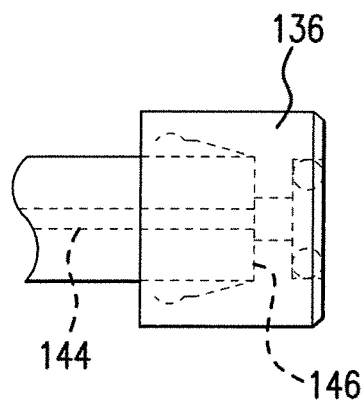
FIG. 5C shows a schematic view of another part of the plug for temporarily or permanently stopping flow in a pipeline according to the embodiment of FIG. 5A.

In this embodiment, as shown in FIG. 5C, the system further includes an insertion line 120 for setting the plug 110 in position in the pipeline to be repaired. The insertion line 120 includes a tether 144 for insertion and retrieval of the plug 110. The insertion line 120 further includes a coupling 146 for connecting to the slider 118 via a connector 142 on the plug 110. The coupling 146 preferably includes a magnet 136 to simplify the connection of the insertion line 120 to the plug 110.

In operation, the system of this invention is capable of entering the pipe via a no-blow stuffing box through a gas riser. The insertion line 120 pushes the plug 110 into the pipeline to a desired area for repair. Next, the slider 118 moves along the center piston 112 to collapse and fold the compressible member 114 until the compressible member 114 contacts an inner surface of the pipe creating a seal. The insertion line 120 then disconnects from the plug 110. After the pipe is repaired, the insertion line 120 is pushed back down the pipeline and re-engages the plug 110. The plug 110 returns to its extended position with the narrowed outside diameter 138 and the whole assembly is retrieved through the gas riser and the stuffing box allowing pipeline to pressurize again.

In a preferred embodiment, the system of this invention may use both the inflatable plug 10 and the compressible plug 110 in a single pipeline to improve the seal at the repair area. The system may further include the use of a plurality of the inflatable plug 10 and/or a plurality of the compressible plug 110.

The described invention comprises an inexpensive, fast, and safe way to temporarily or permanently stop off a pipeline.

It will be appreciated that details of the foregoing embodiments, given for purposes of illustration, are not to be construed as limiting the scope of this invention. Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention, which is defined in the following claims and all equivalents thereto. Further, it is recognized that many embodiments may be conceived that do not achieve all of the advantages of some embodiments, particularly of the preferred embodiments, yet the absence of a particular advantage shall not be construed to necessarily mean that such an embodiment is outside the scope of the present invention.

What is claimed is:

1. A method for stopping flow in a pipe comprising:
   providing a plug including a body with an inflatable member, a cap on a first end of the body and an inflation connector valve on an opposite second end of the body;
   connecting an inflation line with a coupling to the connector valve on the plug;
   positioning the plug in the pipe with the inflation line;
   inflating the inflatable member with the inflation line to seal the pipe;
   detaching the inflation line from the plug; and
   retrieving the plug by reconnecting the inflation line to the plug, and deflating the inflatable member, and removing the plug from the pipe with the inflation line.

2. The method of claim 1 wherein the inflatable member surrounds the body.

3. The method of claim 1 wherein the body is made of non-reactive, durable material and/or compounds.

4. The method of claim 1 wherein the inflatable member is made of non-reactive, durable material and/or compounds.

5. The method of claim 4 wherein the inflatable member is made of rubber.

6. The method of claim 1 wherein the inflatable member is capable of expansion when positioned in the pipe, thereby sealing the pipe.

7. The method of claim 1 wherein the inflation line further comprises a pump adapted to inflate the plug; and
   a tether adapted to deposit the plug into a desired area of the pipe.

8. The method of claim 7 wherein the tether is also adapted to retrieve the plug from the desired area of the pipe.

9. The method of claim 1 wherein the inflation line is adapted to expand the inflatable member, further comprising a seal on an inner surface of the pipe due to the expansion of the inflatable member.

10. The method of claim 9 wherein the seal causes the inflation line to disconnect from the plug.

11. A system for stopping flow in a pipe comprising:
    a plug positioned in a pipe, wherein the plug comprises a piston with a compressible member and a connector;
    an insertion line with a coupling for connecting to the connector on the plug; and
    wherein the plug is positioned in the pipe with the insertion line;
    wherein the compressible member collapses increasing a diameter of the compressible member thereby sealing the pipe and the insertion line detaches from the plug and is removed from the pipe; and
    wherein the plug is retrieved by reconnecting the insertion line to the plug, the compressible member extends reducing the outside diameter of the compressible member unsealing the pipe, and the plug is removed from the pipe with the insertion line.

12. The system of claim 11 wherein the insertion line further comprises a tether for insertion and retrieval of the plug.

13. The system of claim 12 wherein the coupling further comprises a magnetic component to aid the insertion line in insertion and retrieval of the plug.

14. The system of claim 11, the plug further comprising a cap on a first end of the piston and a slider on a second opposite end of the piston.

15. The system of claim 11 wherein the compressible member surrounds the piston.

16. The system of claim 11 wherein the compressible member is made of non-reactive, durable material and/or compounds.

17. The system of claim 16 wherein the compressible member is made of silicone.

18. The system of claim 11 wherein the compressible member has a first outside diameter when the compressible member is in an extended position, wherein the plug is adapted for removal or insertion into the pipe.

19. The system of claim 18 wherein the compressible member has a second outside diameter, larger than the first outside diameter when the compressible member is in a retracted position, wherein the plug is secured in place in the pipe.

20. The system of claim 19 wherein the slider is adapted to move the compressible member between the extended position and the retracted position.

* * * * *